United States Patent
Lester

(10) Patent No.: US 9,656,236 B2
(45) Date of Patent: May 23, 2017

(54) METHOD AND COMPOSITION FOR ABSORBING IONIZING RADIATION

(71) Applicant: James Lester, Auckland (NZ)

(72) Inventor: James Lester, Auckland (NZ)

( * ) Notice: Subject to any disclaimer, the term of this patent is extended or adjusted under 35 U.S.C. 154(b) by 77 days.

(21) Appl. No.: 14/813,125

(22) Filed: Jul. 30, 2015

(65) Prior Publication Data

US 2017/0028379 A1    Feb. 2, 2017

(51) Int. Cl.
*G21F 9/12* (2006.01)
*B01J 20/02* (2006.01)
*B01D 53/02* (2006.01)
*B01J 20/24* (2006.01)
*B01J 20/28* (2006.01)
*B01J 20/32* (2006.01)
*F24F 3/16* (2006.01)

(52) U.S. Cl.
CPC .............. *B01J 20/02* (2013.01); *B01D 53/02* (2013.01); *B01J 20/24* (2013.01); *B01J 20/2803* (2013.01); *B01J 20/3287* (2013.01); *F24F 3/1603* (2013.01); *F24F 2003/1614* (2013.01)

(58) Field of Classification Search
CPC .......... G21F 9/302; G21F 9/12; B09B 3/0041
USPC ....................................................... 588/901
See application file for complete search history.

(56) References Cited

U.S. PATENT DOCUMENTS 5,878,355 A * 3/1999 Berg .................... B01J 13/0095
427/212

* cited by examiner

*Primary Examiner* — Edward Johnson
(74) *Attorney, Agent, or Firm* — Weiss & Moy, P.C.; Jeffrey D. Moy

(57) ABSTRACT

A method and composition for absorbing ionizing radiation in air flow systems. A neutron poison is used in combination with a binder and is applied to a filter of an air flow system with the result that ionizing radiation is absorbed from the filter and air.

11 Claims, No Drawings

METHOD AND COMPOSITION FOR ABSORBING IONIZING RADIATION

FIELD OF INVENTION

The invention generally relates to a method and composition for absorbing ionizing radiation. More particularly but not exclusively the invention relates to a method and composition for absorbing ionizing radiation from the air and from any accumulated radiation in the filter of an air flow system.

BACKGROUND

Some buildings have air flow problems and/or problems with temperature control and so have air flow systems which typically use air from outside the building. It is a well known problem that ionizing radiation, bacteria and other microorganisms contaminate the air we breathe and the environments we live in. It is further known in the field of air flow systems that they tend to have poor air filtration systems and as such, the air inside the building is frequently contaminated.

It is an object of a preferred form of the present invention to go at least some way towards addressing this problem. While this is an object of a preferred embodiment, it should not be seen as a limitation on the scope of the invention as claimed. The object of the invention per se is simply to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein; this reference does not constitute an admission that any of these documents form part of the common general knowledge in the art, in the United States of America or in any other country.

The term "comprising" and derivatives thereof, eg "comprises", if and when used herein In relation to a combination of features should not be taken as excluding the possibility that the combination may have further unspecified features. For example, a statement that an arrangement "comprises" certain parts does not mean that it cannot also, optionally, have additional parts.

SUMMARY OF THE INVENTION

According to one aspect of the invention there is provided a method for absorbing ionizing radiation, comprising;
  applying to a filter of an air flow system at least one binder; and
  applying to the filter at least one neutron poison so that the neutron poison is bound to the filter by the binder, and the neutron poison absorbs accumulated ionizing radiation in the filter and longing radiation from air which passes through the filter.
Preferably the neutron poison is substantially boric acid.
Preferably the neutron poison is substantially B-10 enriched boric add.
Preferably the binder is substantially distillates (petroleum) hydrotreated heavy paraffinic oil.
Preferably the binder and neutron poison are applied simultaneously.

Preferably the binder and neutron poison are applied separately.
Preferably the binder and neutron poison are sprayed onto the filter from an aerosol can.
Preferably the binder and neutron poison are brushed onto the filter.
Preferably the air flow system is an air conditioning system.
Preferably the air flow system is a heat pump system.
Preferably the air flow system is a ventilation system.

In another aspect of the invention there is provided an ionizing radiation absorbing filter when used for absorbing ionizing radiation in an airflow system, having:
  a filter;
  at least one neutron poison; and
  at least one binder which binds the at least one neutron poison to the filter;
  the filter being formed such that when in use in an airflow system the neutron poison absorbs accumulated ionizing radiation in the filter and ionizing radiation from air which passes through the filter.
Preferably the neutron poison is substantially boric acid.
Preferably the neutron poison is substantially B-10 enriched boric acid.
Preferably the binder is substantially distillates (petroleum) hydrotreated heavy paraffinic oil.

In another aspect of the invention there is provided a composition when used for absorbing ionizing radiation in an airflow system comprising:
  at least one neutron poison; and
  at least one binder;
the composition adapted such so that when in use the composition is applied to a filter of an air flow system and the neutron poison is bound by the binder to the filter with the result that neutron poison absorbs accumulated ionizing radiation in the filter and Ionizing radiation In an airflow system.
Preferably the neutron poison is substantially boric acid.
Preferably the neutron poison is substantially B-10 enriched boric acid.
Preferably the binder is substantially distillates (petroleum) hydrotreated heavy paraffinic oil.
Preferably the composition is in an aerosol formulation.

DETAILED DESCRIPTION

Preferred forms of the invention will now be described by way of example although it should be appreciated that the inventive concept is not limited to these.

In a preferred embodiment the invention provides a method of absorbing ionizing radiation by applying a composition to a filter of an air flow system.

Radiation is a process in which electromagnetic waves of the whole electromagnetic spectrum as well as energetic particles including atomic and subatomic particles travel through a medium. Radiation is largely classified into ionizing radiation and non-Ionizing radiation. There are different types of ionizing radiation such as neutron radiation which is a type of ionizing radiation which consists of free neutrons and can cause biological harm to the human body.

The inventive composition comprises a neutron poison and a binder. A neutron poison (also called a neutron absorber) is a substance with a large neutron absorption cross-section which can absorb ionizing radiation, in a preferred embodiment of the invention the neutron poison comprises boric acid. Boric acid (molecular formula: $H3BO3$) is an inorganic acid and is a white powder or transparent crystallized substance that is soluble in water, Natural boron contains two stable isotopes, namely B-10 and B-11. B-10's cross section for thermal neutron absorption is larger than B-11 end so enriched boric acid with higher B-10 is preferred. Another advantage of using boric acid as the neutron poison is that it also has antibacterial, antifungal, antiviral properties, it also has dust, haze, pollution and small particle retention properties.

In a particularly preferred embodiment of the invention the boric acid is prepared from either triethanolamine borate C6H12BNO3, Triethanolamine borate C6H12NO3B, or trimethyl borate B(OCH3)3, all of which render the same result, being that they all decompose in the atmosphere in the presence of moisture, leaving behind boron in the form of boric acid as a white powder covering the surface to which they are applied to. Preparation of the above is to heat ethanol or methanol to approximately 50 degrees C. and add 7% boric acid (but not limited to 7%) to the solution while stirring. In some embodiments crystal forming inhibitors can be added to the solution.

It will appreciated by those skilled In the art that other neutron poisons can be used such as boral, berated aluminum, borax, boron carbide, boron containing alloys, boron nitride, boron oxide, iron bonds, burnable poisons for reactor fuel, sodium pentaborate etc.

The binder is preferably a substance which is capable of binding the neutron poison to a filter. In a preferred embodiment of the invention the binder consists of distillates (petroleum), hydrotreated heavy paraffinic oil. The binder may also contain a marker such as C.I.Solvent red 164 (DIY) and/or prussian blue cane.

The neutron poison and binder is applied to a filter of an air flow system such as an air conditioner, a heat pump or a ventilation system. It will be appreciated by those skilled in the art that the term filter used throughout the specification also encompasses a screen or any other device which has a similar function to a filter or screen through which air passes, in a particularly preferred embodiment of the invention the poison end binder is applied to the filter at the same time. However it will be appreciated by those skilled in the art that the neutron poison and binder can be applied separately to achieve the same result. The composition can be applied in a number of different ways such as being sprayed on, painted on, or can be added at the time the filter is being manufactured etc. In the most preferred embodiment the neutron poison and binder are formulated such that they are contained in the same aerosol can and sprayed onto the filter.

Once the composition has been applied to the filter any ionizing radiation already accumulated In the filter will be absorbed by the neutron poison and any ionizing radiation in the air which passes through the filter will be absorbed by the neutron poison.

It will be appreciated that those skilled In the art (e.g. a chemist or physicist) could easily run a number of tests to ascertain whether ionizing radiation has been absorbed by the neutron poison bound to the filter. One such way could be taking a Geiger counter reading of the filter or air prior to applying the neutron poison and binder and one reading afterwards. Another way would be using a simple laboratory test for example some neutron poison are deleted as they absorb ionizing radiation. Further in some neutron poisons the isotope composition can also be tested for example Boron which is enriched in B-10, when it absorbs ionizing radiation the B-10 is depleted. It will also be appreciated that the level of absorption can vary depending on what neutron poison is used, the concentration of the neutron position and the amount added to the filter.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the particular elements of the neutron poison and binder may vary dependent on the particular application for which it is used without variation in the spirit and scope of the present invention.

In addition, although the preferred embodiments described herein are directed to methods and a composition for absorbing ionizing radiation it will he appreciated by those skilled in the art that variations and modifications are possible within the scope of the appended claims.

The invention claimed is:

1. A method for absorbing ionizing radiation, comprising:
applying to a filter of an air flow system at least one binder; and
applying to the filter at least one neutron poison so that the neutron poison is bound to the filter by the binder, and the neutron poison absorbs accumulated ionizing radiation in the filter and any ionizing radiation from air which passes through the filter.

2. A method according to claim 1, wherein the neutron poison is substantially boric acid.

3. A method according to claim 1, wherein the neutron poison is substantially B-10 enriched boric acid.

4. A method according to claim 1, wherein the binder is substantially distillates (petroleum) hydrotreated heavy paraffinic oil.

5. A method according to claim 1, wherein the binder and neutron poison are applied simultaneously.

6. A method according to claim 1 wherein the binder and neutron poison are applied separately.

7. A method according to claim 1 wherein the binder and neutron poison are sprayed onto the filter from an aerosol can.

8. A method according to claim 1 wherein the binder and poison are brushed onto the filter.

9. A method according to claim 1, wherein the air flow system is an air conditioning system.

10. A method according to claim 1, wherein the air flow system is a heat pump system.

11. A method according to claim 1, wherein the air flow system is a ventilation system.

* * * * *